(12) United States Patent
Takahashi et al.

(10) Patent No.: US 7,289,702 B2
(45) Date of Patent: Oct. 30, 2007

(54) OPTICAL WAVEGUIDE APPARATUS

(75) Inventors: Makoto Takahashi, Kawagoe (JP);
Tatemi Ido, Kodaira (JP); Hirohisa Sano, Fukaya (JP); Nobuo Miyadera, Ushiku (JP)

(73) Assignees: Hitachi, Ltd., Tokyo (JP); Hitachi Chemical Co., Ltd., Tokyo (JP)

( * ) Notice: Subject to any disclaimer, the term of this patent is extended or adjusted under 35 U.S.C. 154(b) by 206 days.

(21) Appl. No.: 10/535,704

(22) PCT Filed: Feb. 13, 2003

(86) PCT No.: PCT/JP03/01511
§ 371 (c)(1), (2), (4) Date: Oct. 5, 2005

(87) PCT Pub. No.: WO2004/051329
PCT Pub. Date: Jun. 17, 2004

(65) Prior Publication Data
US 2006/0153501 A1    Jul. 13, 2006

(30) Foreign Application Priority Data
Nov. 29, 2002  (JP)  ............................. 2002-347122

(51) Int. Cl.
*G02B 6/26* (2006.01)
(52) U.S. Cl. .............................. 385/50; 385/31; 385/43
(58) Field of Classification Search ..................... None
See application file for complete search history.

(56) References Cited

U.S. PATENT DOCUMENTS 4,958,897 A * 9/1990 Yanagawa et al. ............ 385/50

FOREIGN PATENT DOCUMENTS

| JP | 05-232322 | 2/1992 |
|---|---|---|
| JP | 5-232322 | 2/1992 |
| JP | 06-174954 | 7/1993 |
| JP | 08-190026 | 1/1995 |
| JP | 11-072635 | 6/1998 |
| JP | 11-72635 | 6/1998 |
| JP | 2000-180646 | 12/1998 |
| JP | 2001-100055 | 9/1999 |
| JP | 2002-006155 | 6/2000 |
| JP | 2002-139641 | 11/2000 |
| JP | 2002-243960 | 2/2001 |
| JP | 2004-271803 | 3/2003 |
| JP | 2004-302143 | 3/2003 |
| WO | WO 03/036346 A1 | 2/2002 |

OTHER PUBLICATIONS

International Search Report from PCT/JP03/01511 dated Mar. 18, 2003.

* cited by examiner

*Primary Examiner*—Sung Pak
(74) *Attorney, Agent, or Firm*—Reed Smith LLP; Stanley P. Fisher, Esq.; Juan Carlos A. Marquez, Esq.

(57) ABSTRACT

The present invention provides an optical module using optical waveguides which permits easy fabrication of a PLC type optical multiplexer/demultiplexer with reduced loss. The optical module comprises cores which are contiguous to each other through a dicing groove adapted to position and fix an optical functional part such as a wavelength selection filter and a core branched from the said cores. A slight gap is present between the former and the latter core and both cores are narrower in width in the vicinity of the dicing groove than the other portions.

17 Claims, 12 Drawing Sheets

(A)

(B)

(C)

OPTICAL WAVEGUIDE APPARATUS

TECHNICAL FIELD

The present invention relates to optical modules using optical waveguides. In particular, the present invention is effectively applicable to a PLC (Planer Lightwave Circuit) type optical multiplexer/demultiplexer.

BACKGROUND ART

Optical modules using optical waveguides, particularly optical multiplexer/demultiplexer, are important optical parts used in many optical modules, including ones for wavelength division multiplexing communication. Recently, attempts have actively been made to constitute an optical multiplexer/demultiplexer by PLC for reduction in size and cost.

FIG. 10 is a plan view showing a basic construction of a conventional PLC type optical multiplexer/demultiplexer. The optical multiplexer/demultiplexer has a construction such that a wavelength selection filter 3 is inserted into a crossing portion of a Y-branch type optical waveguide comprising optical waveguides 1a, 1b and 1c. In FIG. 10, only a core portion of the optical waveguide is shown, which is embedded in a substrate portion including the optical waveguide. All of the drawings which follow the same figure also show only core portions. The wavelength selection filter 3 is fixedly inserted into a dicing groove 2 which is cut vertically into the surface of the substrate portion. Although in FIG. 10 a gap is shown between the groove 2 and an optical member of the filter 3, the gap is shown to make it easy to understand that the optical member 3 is inserted into the groove 2. Actually, the optical member is fixed by being inserted into the groove. The illustrated dimensions do not show concrete dimensions in a proportional relation. This is also the case with the succeeding drawings each showing like groove and optical member.

When light having a transmission wavelength of the wavelength selection filter 3 is incident on the above optical module using optical waveguides and light having a reflection wavelength is incident on the same module from the optical waveguide 1c, both light signals propagate through the optical waveguide 1a. In this way, this optical module acts as an optical multiplexer. If both light signals are incident from the optical waveguide 1a, their transmission wavelength light and reflection wavelength light propagate through the optical waveguide 1b and the optical waveguide 1c, respectively, so that this optical module acts as an optical demultiplexer. Thus, according to the illustrated construction it is possible to obtain a PLC type optical multiplexer/demultiplexer.

However, this construction involves the drawback in which an excess insertion loss occurs in the route of reflected light due to a positional deviation of the wavelength selection filter 3. This is because offset occurs between the light reflected by the filter and the optical waveguide on which the light is incident. Since the position of the wavelength selection filter is determined by the dicing groove, an excess insertion loss can be prevented by enhancing the positioning accuracy of dicing. In this case, however, a complicated process results, causing an increase in fabrication cost. Therefore, in the development of a PLC type optical multiplexer/demultiplexer, it is an important subject how an element of lessened insertion loss is to be fabricated in a simple manner.

The following proposals have been made heretofore for attaining the above-mentioned subject.

FIG. 11 shows a first example described in Japanese Patent Laid-open No. 6-174954 (Patent Literature 1). According to this example, in the vicinity of the wavelength selection filter 3, a spot size Ws of propagating light is made larger than in the other portion to suppress the influence of offset. The spot size Ws can be enlarged by either increasing or decreasing a core width W. One example of core width options described in Patent Literature 1 is shown in FIG. 11. FIG. 14 shows the relationship between the core width W and the spot size Ws of propagating light. In the same figure, the difference $\Delta$ in refractive index between core and clad is set at 0.84%, core thickness d is set at 4.5 µm, and operating wavelength is set at 1.3 µm. In this case, a cutoff core width (a maximum value of core width free of a higher mode) is 4.5 µm and Ws is 5 µm. Generally, in an optical circuit for communication, a core having a cutoff core width is used from the standpoint of maintaining a single mode characteristic and decreasing the radius of curvature. In this example, therefore, W of a portion sufficiently spaced away from the filter is set at 4.5 µm. It is seen from FIG. 14 that the value of Ws can be made equal to, e.g., 10 µm by setting W at 11 µm or 0.7 µm. Thus, it is seen that in this example the influence of offset is suppressed by adopting a tapered shape such that the core is widened from 4.5 to 11 µm or narrowed to 0.7 µm in the vicinity of the filter.

FIG. 12 shows a second example described in Japanese Patent Laid-open No. 8-190026 (Patent Literature 2). According to this example, in the vicinity of the wavelength selection filter 3, the width of the optical waveguide is made larger than in the other portion to suppress the influence of offset as in the above first conventional example. In this example, moreover, a gap is formed in the core crossing portion to prevent formation of an air bubble during fabrication of the optical waveguide. According to this example, it is also possible to prevent occurrence of an excess loss caused by an air bubble. FIG. 13 shows a third example described in Japanese Patent Laid-open No. 2000-180646 (Patent Literature 3). In this example, cores 1a, 1b and 1c are separated from one another to prevent the formation of an air bubble and the width of each core is narrowed in a tapered shape toward a wavelength selection filter to diminish an insertion loss.

The above conventional examples still involve the following drawbacks. First, in the above first conventional example, a dead-ended space is present between the cores 1a and 1b, so that such an air bubble 111 as shown in FIG. 15 is apt to occur at the time of forming a clad, and an excess loss caused by the air bubble is apt to occur. FIG. 16 shows the relationship between an excess loss caused by an air bubble and the core width W, in which the axis of ordinate represents the excess loss. The example of FIG. 16 is a calculation result obtained by a two-dimensional BPM (Beam Propagation Method). The model shown in FIG. 17 is used for calculating the excess loss. According to this model, first a zero-order eigen mode 114 is introduced and propagated into a rectilinear core 112 with which a square air bubble 111 is in contact. Next, an overlap between a light distribution 115 just after the zero-order eigen mode passing the air bubble 111 and the zero-order eigen mode 114 is calculated to determine an excess loss. Each side length of the square is set at 2 µm. The difference $\Delta$ in refractive index between the core 112 and clad 113, as well as the operating wavelength, are the same as in FIG. 14. From FIG. 16 it is seen that the excess loss caused by the air bubble poses no problem when the core width is large but is serious when the core width is small. For example, when W is set at 11 μm in an effort to widen Ws to 10 μm, the excess loss caused by the air bubble is less than 0.1 dB. However, if W is narrowed to 0.7 μm, there occurs an excess loss of 10 dB or more. This is because the leakage of light from the core becomes greater with narrowing of the core width and hence the air bubble becomes more easily influential. From this point it is seen that widening the core width is advisable in this example. However, in the case of widening the core width, a higher mode is apt to occur even according to the core shape or by a slight positional deviation of the filter. If a higher mode is present, a problem arise in that interference with the zero-order mode occurs, making the light output unstable.

In the above second example, the gap is formed to prevent formation of an air bubble. However, since the structure described therein involves widening the core width, the same problem as in the above first example arises also in this case.

In the above third example, since cores are separated from one another, between cores light is radiated into the clad and propagates. Further, a core-to-core distance dz is as large as about 60 μm. Thus, a problem arises in that both reflected light and transmitted light require a long radiation distance, with a consequent increase of loss. FIG. 18 shows the relationship between the core-to-core distance dz and radiation loss. It is here assumed that Ws and the optical axis on the output side are respectively coincident with those on the incident side and that the refractive index of the clad is 1.52 and the operating wavelength is 1.3 μm. In this case, if dz=60 μm, the radiation loss becomes 4 dB or more for Ws=5 μm (a spot size at cutoff core width). It is seen from the figure that this radiation loss can be decreased by enlarging Ws, but that at dz=60 μm the radiation loss is still 0.4 dB or more even if Ws is widened to 10 μm. Also in this case the loss can be decreased to a level less than 0.1 dB by enlarging Ws up to 20 μm. However, to enlarge Ws to 20 μm, it is necessary to control W to 0.5 μm or less as is seen from FIG. 14, thus requiring an advanced fabrication technique. When W is narrow, the taper length also becomes large in order to prevent the occurrence of radiation loss. Consequently, also drawback occurs in which the number of elements obtained per wafer is decreased.

Thus, even by the above conventional examples, it has so far been practically difficult to fabricate a PLC type optical multiplexer/demultiplexer with reduced loss in a simple manner.

DISCLOSURE OF THE INVENTION

In the present invention it is important to satisfy broadly the following two points in order for at least two optical waveguides to be coupled optically at a certain angle.

(1) PLC (planer lightwave circuit) type optical modules using optical waveguides are provided which can prevent occurrence of a great optical loss even if an optical member is inserted into two optical waveguides in order to perform a desired optical process by use of the optical waveguides. That is, a great optical loss is to be prevented even if the position where the optical member is disposed undergoes a positional deviation due to normal processing in the course of fabrication.

(2) In forming optical waveguides, a qualitative drawback of material such as formation of a bubble is to be avoided to eliminate the influence of the PLC type optical modules using optical waveguides on optical characteristics.

The present invention can satisfy both above requirements not found in the conventional optical modules using optical waveguides.

To meet the above requirements, a PLC type optical multiplexer/demultiplexer according to the present invention has the following construction. That is, the PLC type optical multiplexer/demultiplexer includes a core which is continuous through a dicing groove for positioning and fixing an optical functional part such as a wavelength selection filter and also includes a core branched from the said core, with a slight gap being present between both the cores, and both the cores being narrower in the vicinity of the dicing groove than in the other portion. That is, both the cores are narrowed near the crossing region of the two optical waveguides to enlarge a spot size of propagating light. This construction can also fully cope with a positional deviation in machining the groove used for disposition of the optical member. In manufacturing this optical module using optical waveguides, an air bubble is apt to occur in a clad layer which covers the vicinity of the crossing region of the two optical waveguides. In order to eliminate this problem the gap is formed between the crossing first and second cores.

Thus, according to this construction, an air bubble is not formed in the core branching portion and a radiation loss of light between cores and an excess loss caused by a positional deviation of the dicing groove are suppressed. This makes it possible to fabricate a PLC type optical multiplexer/demultiplexer with a reduced insertion loss in a simple manner.

A typical mode of the present invention will be described below, which has the following features. An optical module using optical waveguides has on a substrate a clad formed of a first light transmitting material and a core formed of a second light transmitting material having a refractive index higher than that of the clad, a groove being formed on the surface of the optical module using optical waveguides. An optical member necessary for the optical module is inserted into the groove. As the optical member, one used in the conventional PLC type optical modules using optical waveguides suffices. For example, a functional part which transmits or reflects or absorbs light, such as a wavelength selection filter, a reflecting mirror, a half mirror, or a light absorbing plate, is inserted into the groove. That is, a mirror is used for reflection and a wavelength selection filter as an example is used for transmission. In the example being considered, wavelength selection is performed by utilizing a difference between reflection wavelength and transmission wavelength. Absorption is used for example in the modulation of a light signal. More specifically, absorption is used in the case of adjusting whether absorption is to be present or not by the application of an electric field for example and modulating only the light of a specific wavelength.

A typical example of the PLC type optical modules using optical waveguides uses the following structure. That is, this structure includes a substrate, as well as such components disposed on the substrate as a first clad layer, at least first and second cores formed on the first clad layer, and a second clad layer which covers at least the first and second cores. The second core has a certain angle relative to the first core and is optically coupled to the first core through a gap. The clad and core layers are usually formed of a resin material. The basic construction of such a structure satisfactorily employs a conventional one.

A planar arrangement of optical waveguides is as below. Cores are present on both sides of the foregoing groove, or the first core is present on only one side of the groove and the second core branches from the first core. Concrete examples of various modes of the present invention include a media converter and an EDFA by way of example of cores being present on both sides of the groove. Examples of first and second cores being present on only one side of the groove include a construction wherein a reflecting mirror is disposed in the first core.

A gap is present in the crossing portion between the first and second cores and the width of the first core and that of the second core are narrower in the vicinity of the groove than in the other portion.

The gap is formed between a side face of the optical waveguide having the first core which side face extends in the axial direction of the first core and a light emitting surface of the optical waveguide having the second core. The side face extending in the axial direction of the first core and the light emitting surface of the optical waveguide having the second core are usually substantially parallel to each other and can be coupled together optically.

Generally, the core width is determined in accordance with the following way of thinking. A desired coupling efficiency for the optical members to be coupled is established. Then, a required spot size from the incident side is determined on the basis of the required coupling efficiency. Once the required spot size is determined, a core width is determined on the basis of the difference $\Delta$ in refractive index between the core and clad of the incident-side optical waveguide. In practical use, the difference $\Delta$ in refractive index is about 0.4 to 1.5.

The first and the second cores are narrowed in a tapered shape near and toward the groove formed in the surface. Preferably, the tapered portions are formed such that an intensity distribution of guided light undergoes a quasi-static change along the optical axis. Further, in the tapered portion of each of the first and second cores, it is also practical that the degree of change in core width is gentler in the narrow core narrow portion than in the broad core portion.

The relationship between the tapered region and the groove is preferred to have the following. Between an end point of the taper where the core width is the narrowest and the surface groove, the width of the first core and that of the second core are equal to the taper end point and are constant. Such a mode is advantageous in the manufacturing process. When the first and second cores are once formed in a continuous state and the groove related to the present invention is formed, dicing is performed in a constant width portion. By so doing, the tolerance in position setting at the time of dicing becomes larger.

In a practical range of the refractive index difference $\Delta$, about 6 to 4 μm and about 0.5 to 3 μm are often used as a large core width and a small core width, respectively. From the practical standpoint it is preferable that the width of the first core and that of the second core be in the range of 0.5 to 1.5 μm as a minimum value.

In the present invention, as a matter of course, the optical module using optical waveguides described above may be used in a plural number to constitute an optical module using optical waveguides. An example thereof is a transceiver for WWDM. It goes without saying that various other devices can be implemented according to purposes.

BEST MODE FOR CARRYING OUT THE INVENTION

Figure 1:
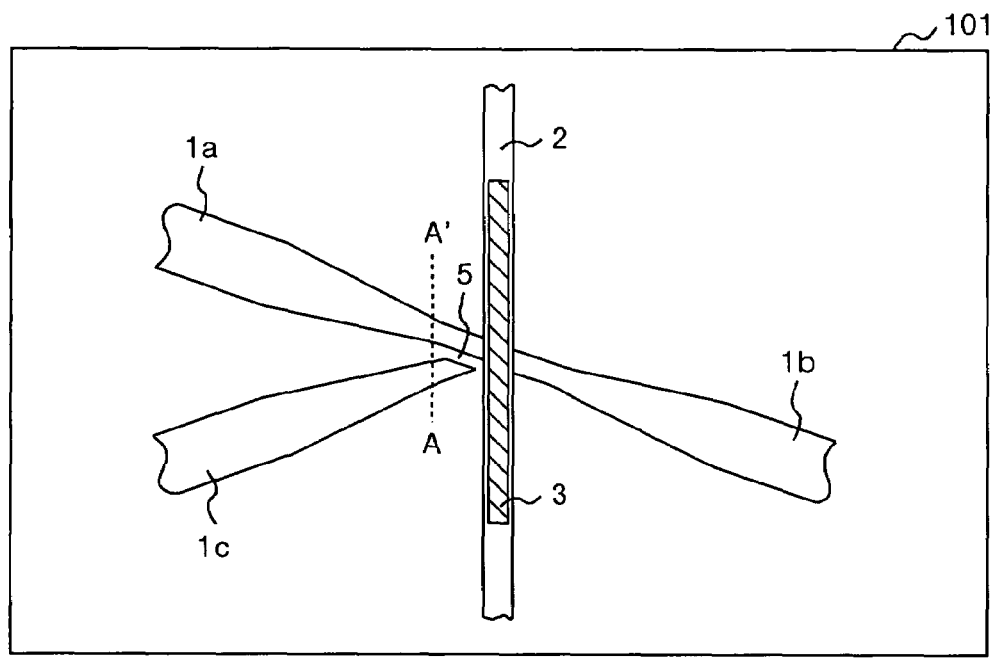
FIG. 1 is a plan view of an optical module according to a first embodiment of the present invention.

Next, embodiments of the present invention will be described concretely. FIG. 1 is a plan view showing a first embodiment of the present invention. As noted above, FIG. 1 also shows the relationship between core portions of optical waveguides on a substrate 101 and, a groove and an optical member inserted to the groove. The drawings which follow and which each illustrate the relationship between core portions of optical waveguides and, a groove and an optical member inserted to the groove also show only the same portion as shown in FIG. 1. Moreover, as in the drawings referred to previously, only core portions of optical waveguides are shown and clad portions are omitted. All of the drawings used for explanation of the present invention take this form to make understanding of the essence easier.

The optical module of this embodiment includes cores 1a and 1b which are continuous to each other through a dicing groove 2 and a core 1c which branches from the core 1a in the vicinity of the dicing groove 2. The widths of the cores 1a, 1b and 1c are narrower in tapered form toward the dicing groove 2. A gap 5 about 5 μm in width is present between the cores 1a and 1c. A wavelength selection filter 3 inserted into the dicing groove 2.

Figure 2:
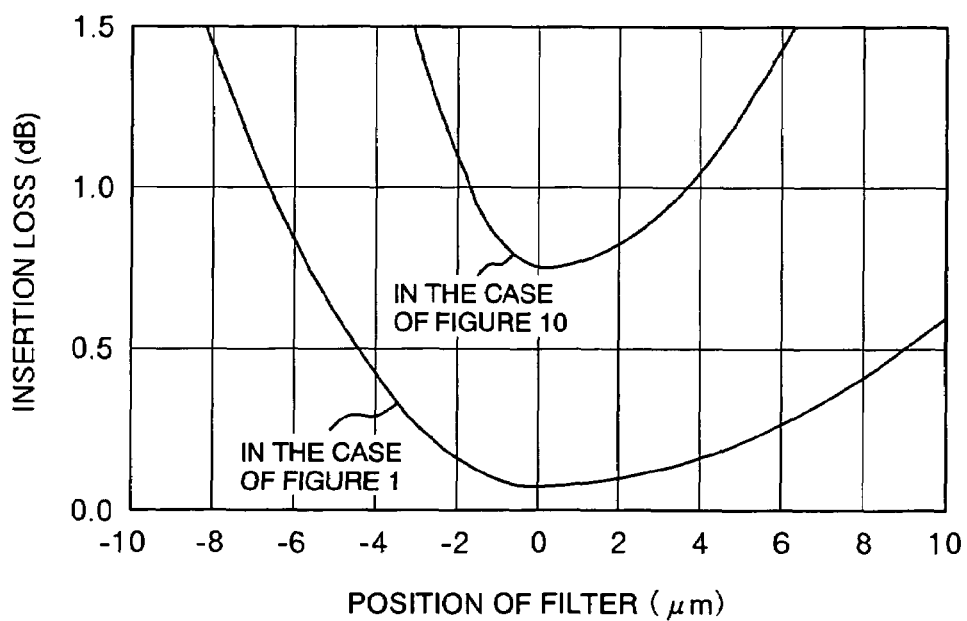
FIG. 2 is a diagram showing the relationship between the position of a filter and insertion loss in the embodiment of the invention.
Figure 10:
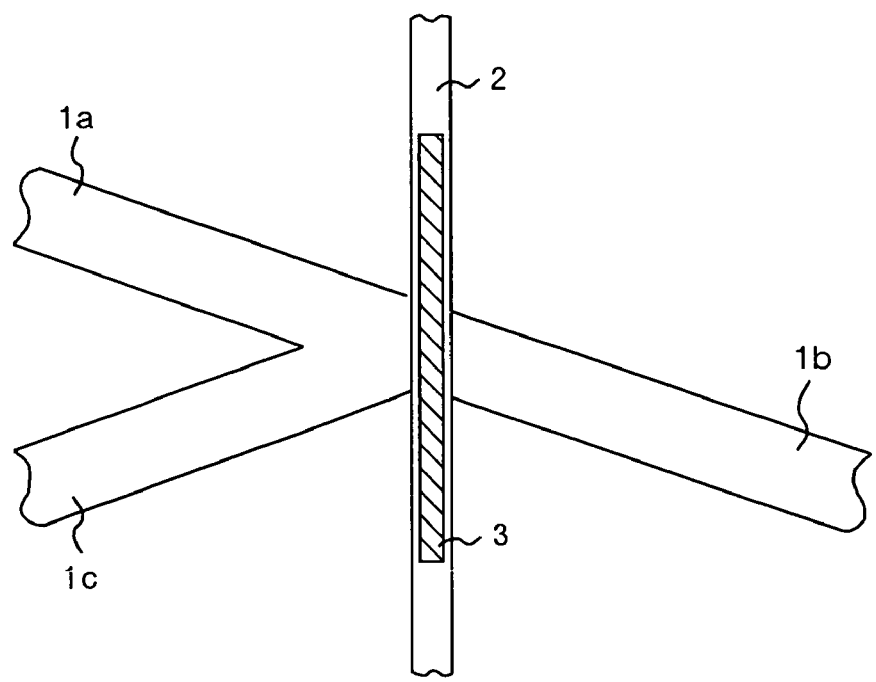
FIG. 10 is a plan view showing a basic construction of a PLC type optical multiplexer/demultiplexer.
Figure 11:
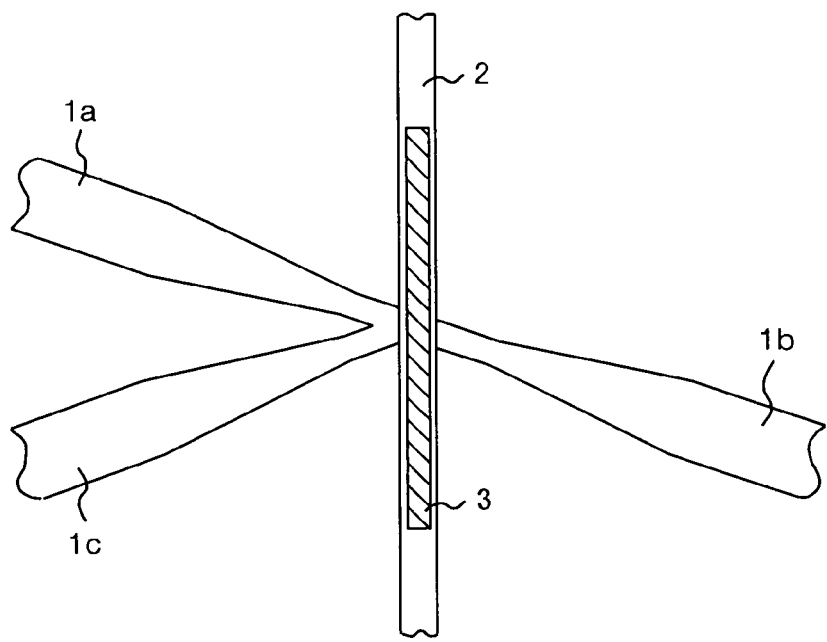
FIG. 11 is a plan view showing a conventional example.
Figure 12:
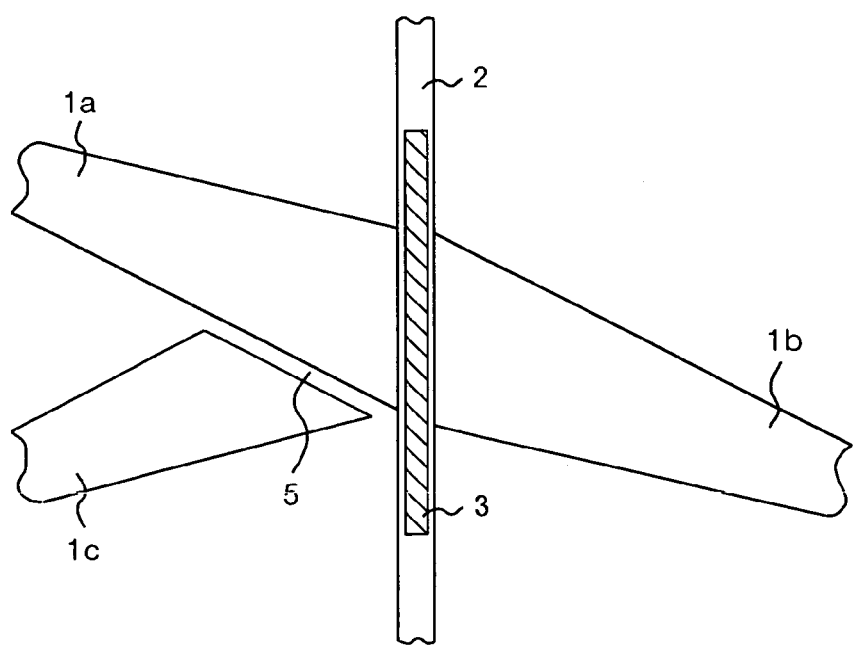
FIG. 12 is a plan view showing a second conventional example.
Figure 13:
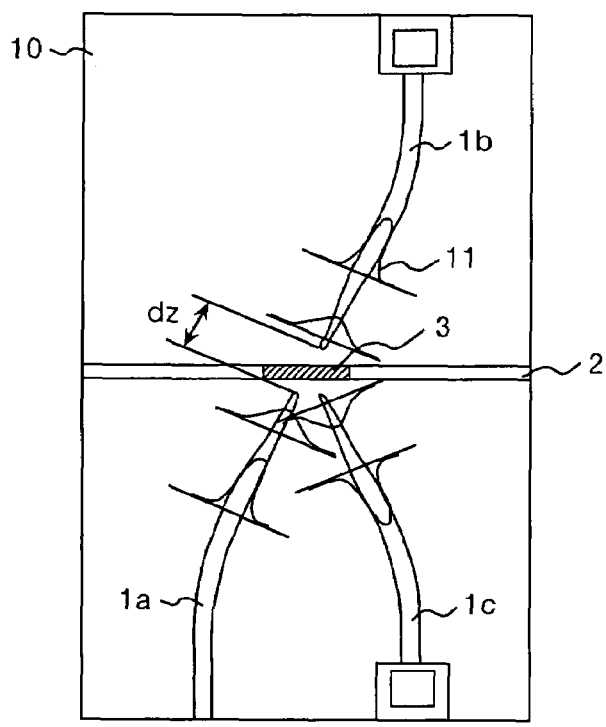
FIG. 13 is a plan view showing a third conventional example.
Figure 14:
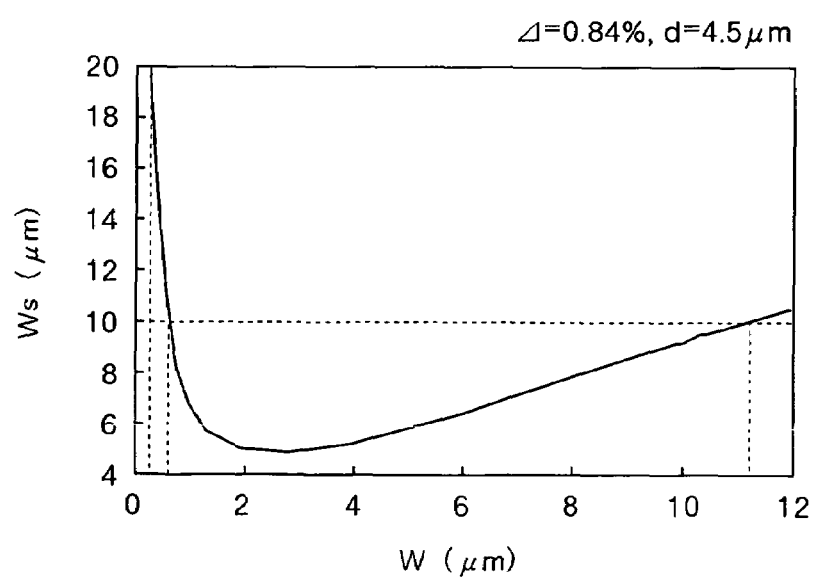
FIG. 14 is a diagram showing the relationship between core width and spot size.
Figure 15:
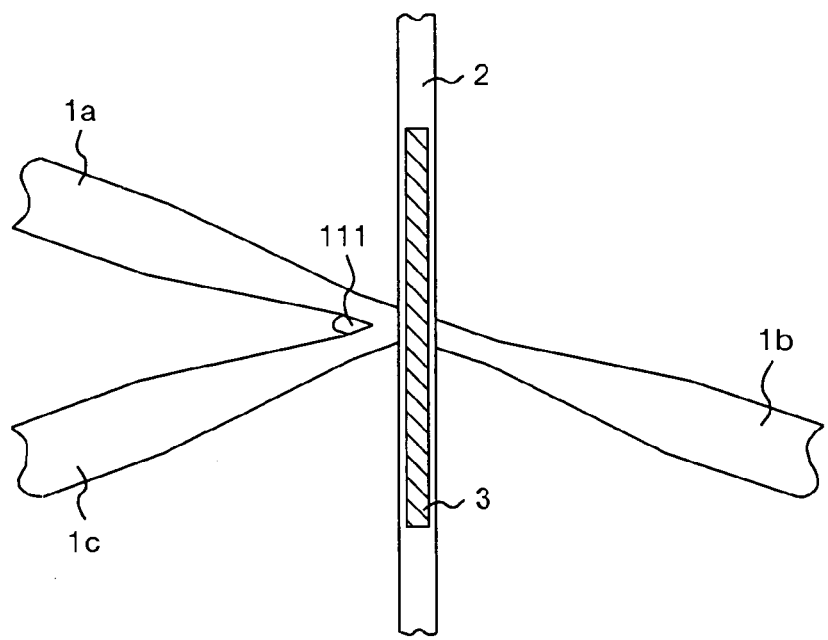
FIG. 15 is a plan view showing a conventional example.
Figure 16:
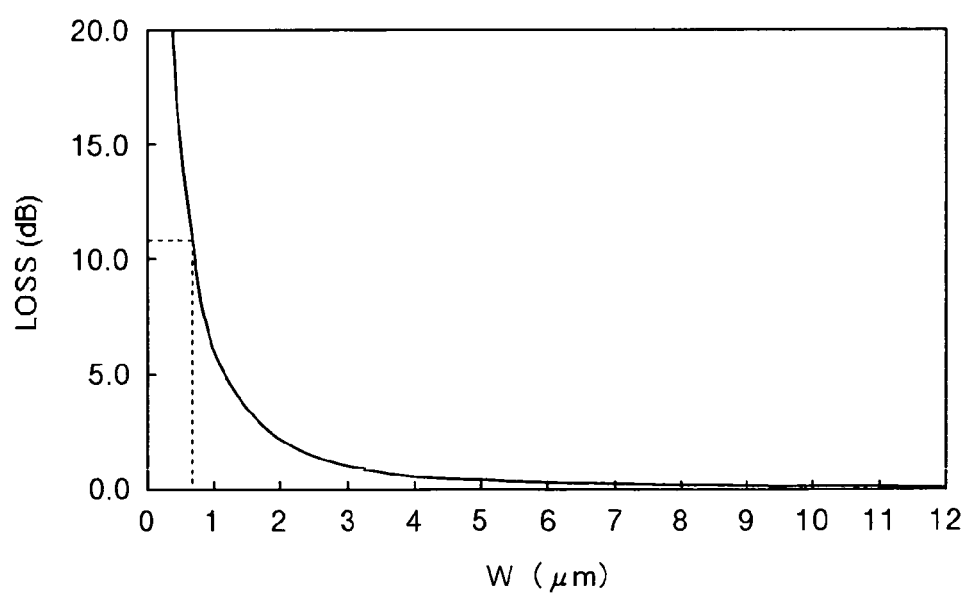
FIG. 16 is a diagram showing the relationship between core width and loss upon occurrence of an air bubble in the conventional example.
Figure 17:
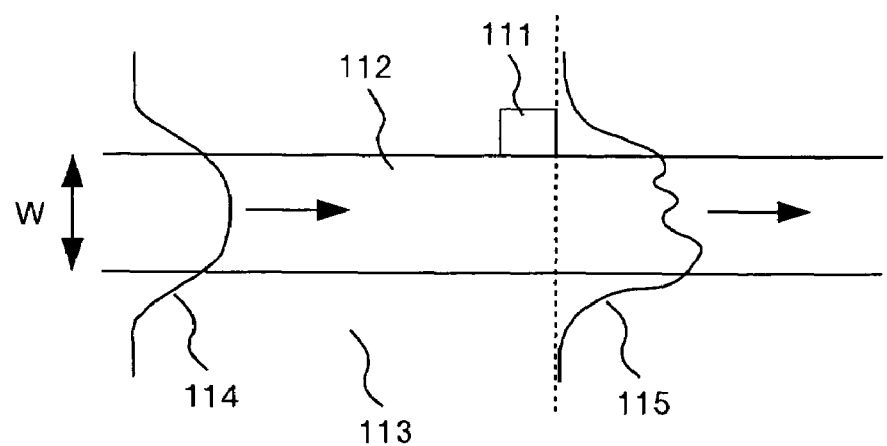
FIG. 17 is a plan view showing a model used to determine the relationship between core width and loss.
Figure 18:
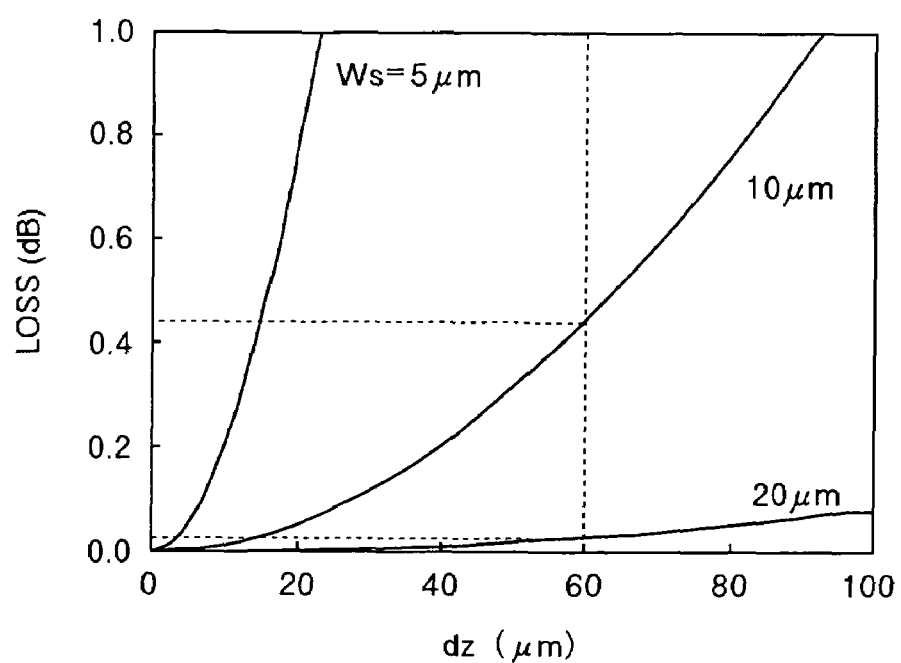
FIG. 18 is a diagram showing the relationship between core-to-core distance and loss.

For this optical module, FIG. 2 shows the relationship between an insertion loss and a positional deviation of the filter in a route of reflected light, assuming that $\Delta$ is 0.84%, the core width near the filter is 0.7 μm, the angle between the cores 1a and 1c is 16° and an operating wavelength is 1.3 μm. In the same figure, the position of the filter and the insertion loss are plotted along the axis of abscissa and the axis of ordinate, respectively. It is here assumed that the origin of the filter position is a crossing position of the axes of both the cores 1a and 1c, a deviation is made in a direction perpendicular to the filter surface, and a position on the side of the core 1b with respect to the origin is on a positive side. The gap between the dicing groove and the filter surface is assumed to be 10 μm. A characteristic obtained in the case of the optical module element shown in FIG. 10 is also shown in FIG. 2 for comparison. It is assumed that the core width in FIG. 10 is 4.5 μm and that an air bubble does not occur. FIG. 2 shows that according to the structure of this embodiment the loss can be greatly decreased in comparison with the conventional optical module and can be fully suppressed even when there is a positional deviation of the filter. Generally, the greater the difference Δ in refractive index, the heavier the insertion loss in the conventional optical module shown in FIG. 10. This is because optical confinement to the core becomes stronger and the spot size decreases. In contrast therewith, according to the structure of this embodiment, the loss can be decreased to a satisfactory extent even where the difference Δ in refractive index is high. Incidentally, $\Delta=(n_1-n_0)/n_1$ where $n_1$ stands for the refractive index of the core and $n_0$ stands for the refractive index of the clad.

Figure 3:
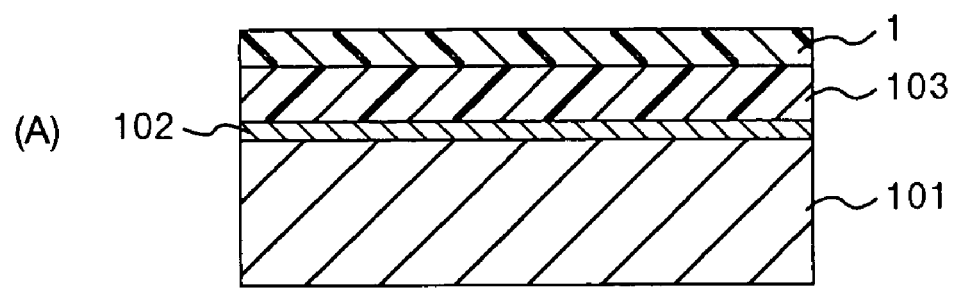
FIG. 3 is a sectional view of the optical module, showing the module in the order of manufacturing steps.
Figure 3:
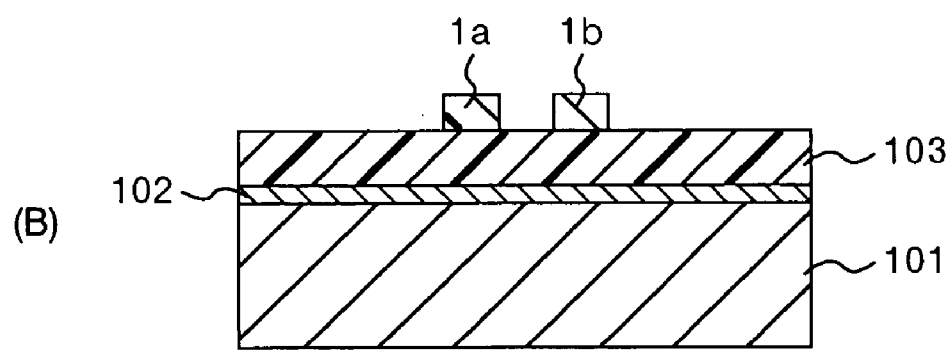
Figure 3:
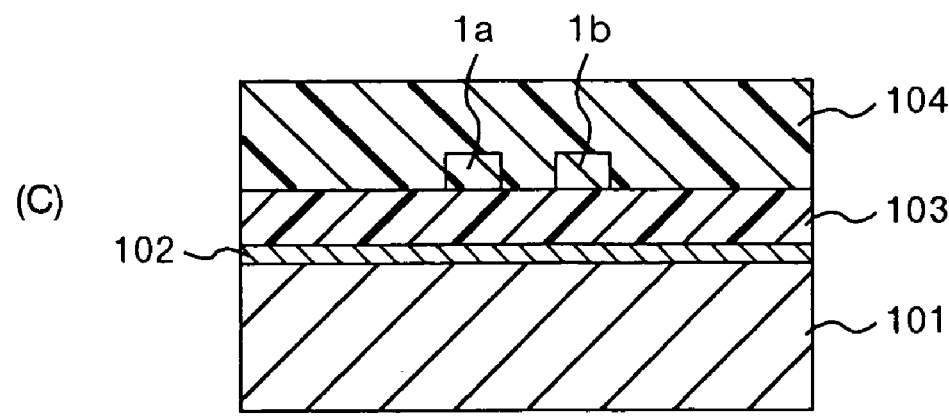

FIG. 3 includes sectional views of the optical module using optical waveguides according to this embodiment, showing the module in the order of fabrication steps. A description will be given of the case where optical waveguides are formed of a polymer material. FIG. 3 is a sectional view taken on line A-A in FIG. 1. First, a lower polymer clad layer 103 and a polymer core layer 1 are formed in this order by spin coating over a silicon (Si) substrate 101 over which is formed a silicon dioxide (SiO$_2$) film 102. Thereafter, the polymer core layer 1 is etched to form cores 1a and 1b by a conventional method. Further, an upper polymer clad layer 104 is formed over the lower polymer clad layer 103 and the cores 1a, 1b by spin coating. Subsequently, the foregoing groove 2 is formed by a conventional dicing method and the filter 3 is inserted into the groove 2. In this way the optical module of this embodiment can be completed.

Figure 4:
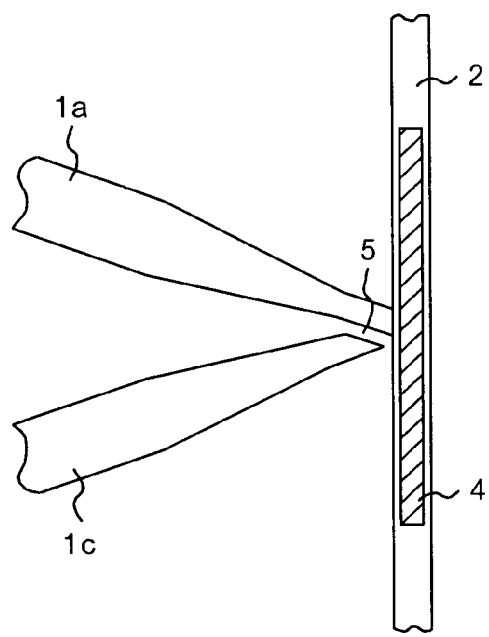
FIG. 4 is a plan view of an optical module according to a second embodiment of the present invention.

FIG. 4 is a plan view showing an optical module using optical waveguides according to a second embodiment of the present invention. This optical module has cores 1a and 1c on the same side as a dicing groove 2. The width of the core 1a and that of the core 1c are narrowed in tapered form toward the dicing groove 2 and a mirror 4 is inserted into the dicing groove 2. According to this structure, a reflector with a low loss can be fabricated even if there is a positional deviation in dicing.

Figure 5:
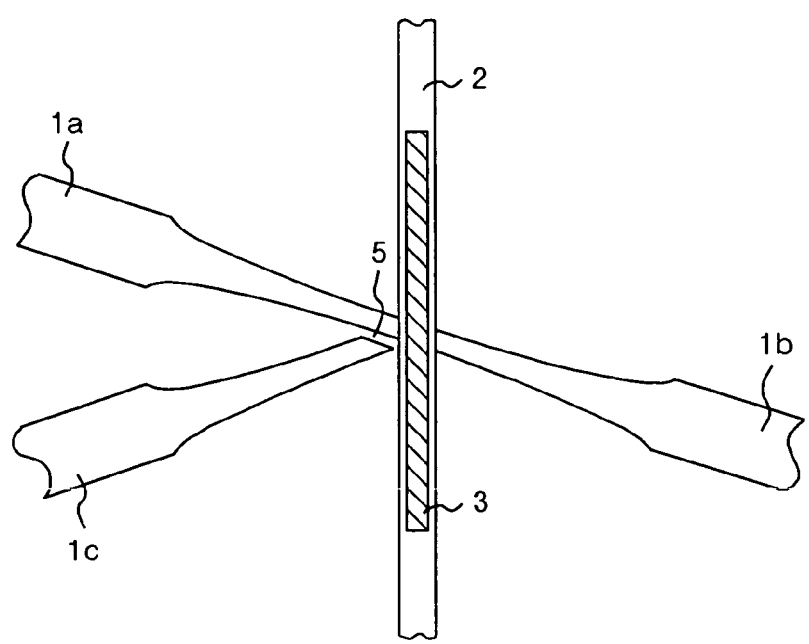
FIG. 5 is a plan view of an optical module according to a third embodiment of the present invention.

FIG. 5 is a plan view showing an optical module using optical waveguides according to a third embodiment of the present invention. As shown in the same figure, the optical multiplexer/demultiplexer of the invention may be configured with its core width changed non-linearly. By optimizing the taper shape, the optical module length can be reduced without an increase of radiation loss in comparison with the case where the core width is changed linearly.

Figure 6:
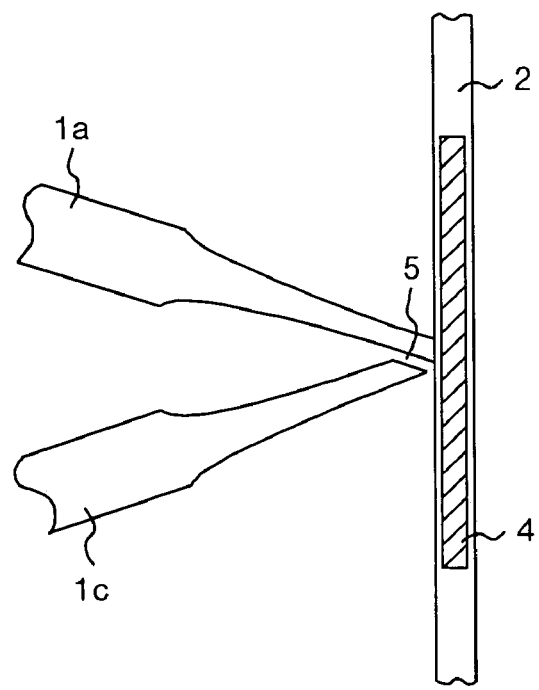
FIG. 6 is a plan view of an optical module according to a fourth embodiment of the present invention.

FIG. 6 is a plan view showing an optical module using optical waveguides according to a fourth embodiment of the present invention. Also in the reflector according to the present invention the core width may be changed non-linearly and the resulting effect is also the same as in the third embodiment.

Next, examples of optical modules according to the present invention will be described below.

Figure 7:
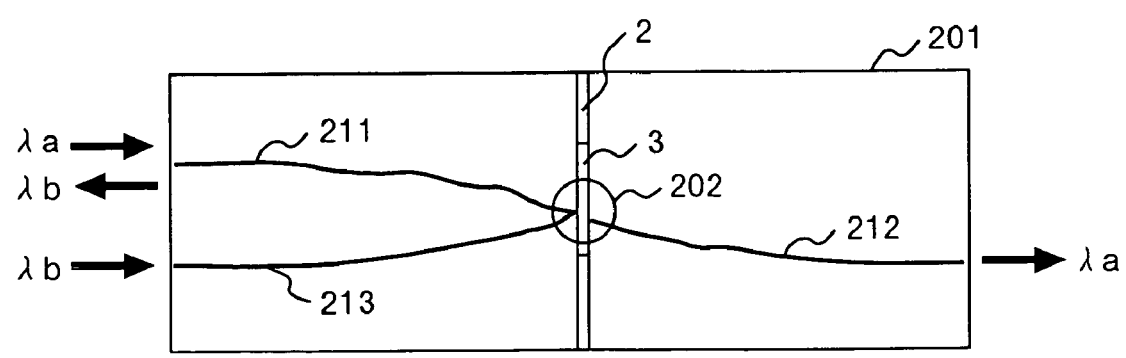
FIG. 7 is a plan view of an optical module according to a fifth embodiment of the present invention.

FIG. 7 is a plan view showing an optical module using optical waveguides according to a fifth embodiment of the present invention. This is an example of a transceiver module for a media converter. In this embodiment, an optical multiplexer/demultiplexer 202 according to the first or the third embodiment of the present invention is formed on a PLC substrate 201. Optical waveguides 211 and 213 are optically connected to one side of the optical multiplexer/demultiplexer 202 and an optical waveguide 212 is optically connected to the other side. A groove 2 is formed in the PLC substrate 201 and a filter 3 is inserted into the groove 2. According to this construction, a transmitted light signal having a wavelength of λa can be received from the optical waveguide 211 through the optical waveguide 212 and likewise a transmitted light signal having a wavelength of λb can be received from the optical waveguide 213 through the optical waveguide 211.

Figure 8:
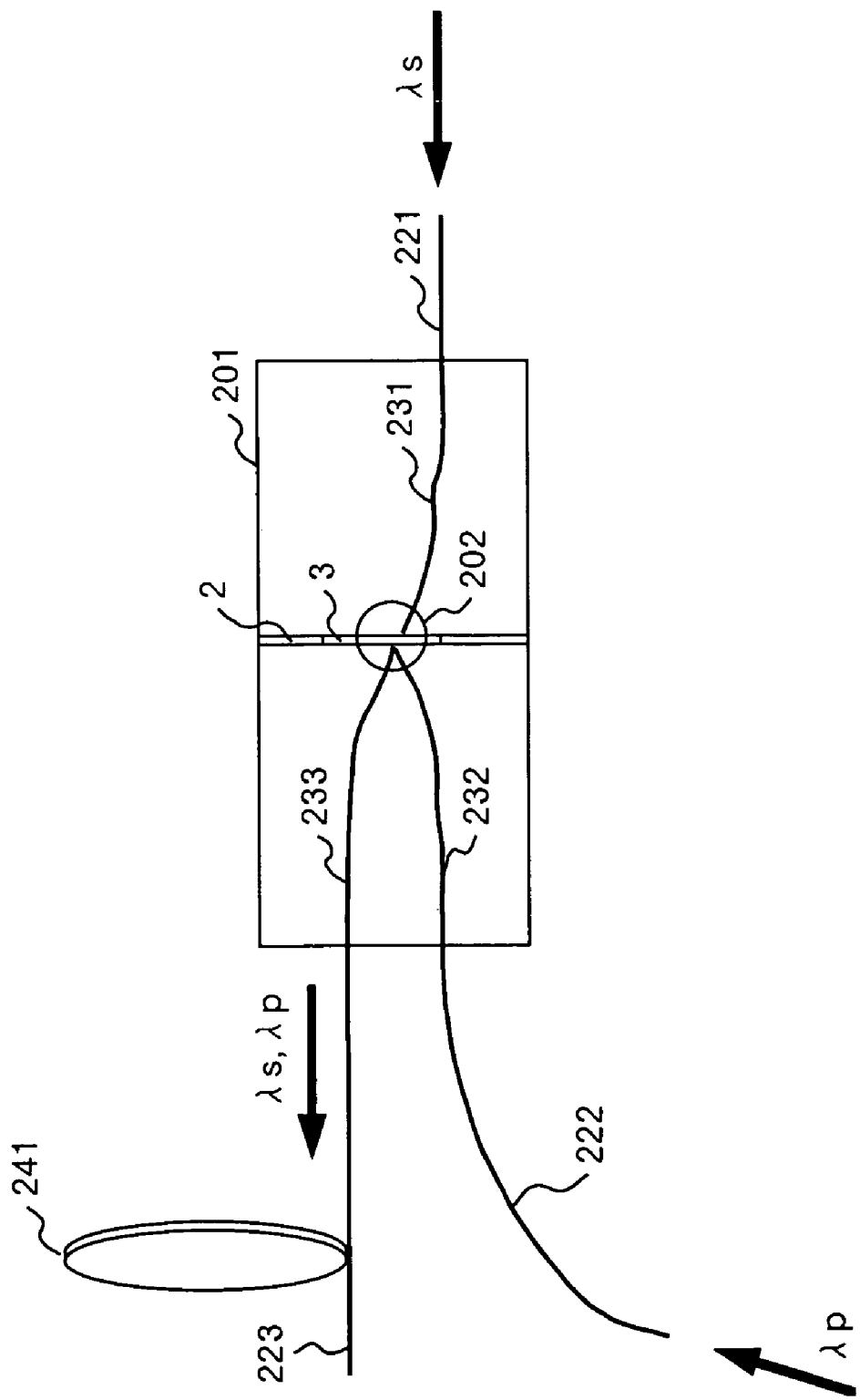
FIG. 8 is a plan view of an optical module according to a sixth embodiment of the present invention.

FIG. 8 is a plan view showing an optical module using optical waveguides according to a sixth embodiment of the present invention. This is an example of a fiber amplifier module. In this embodiment, the optical multiplexer/demultiplexer 202 according to the first or the third embodiment is formed on a PLC substrate 201. As in the example shown in FIG. 7, optical waveguides 233 and 232 are optically connected to one side of the optical multiplexer/demultiplexer 202 and an optical waveguide 231 is optically connected to the other side. A groove 2 is formed in the PLC substrate 201 and a filter 3 is inserted into the groove 2. A fiber amplifier 241 and a single mode fiber 223 are optically connected to the optical waveguide 233 and a single mode fiber 221 is optically connected to the optical waveguide 231. According to this construction, signal light having a wavelength of λs is propagated to the fiber amplifier 241 from the single mode fiber 221 through the optical waveguides 231 and 233. At the same time pump light having a wavelength of λp is propagated from the single mode fiber 222 to the fiber amplifier 241 through the optical waveguides 232 and 233. Thus, amplified signal light can be propagated into the single mode fiber 223.

Figure 9:
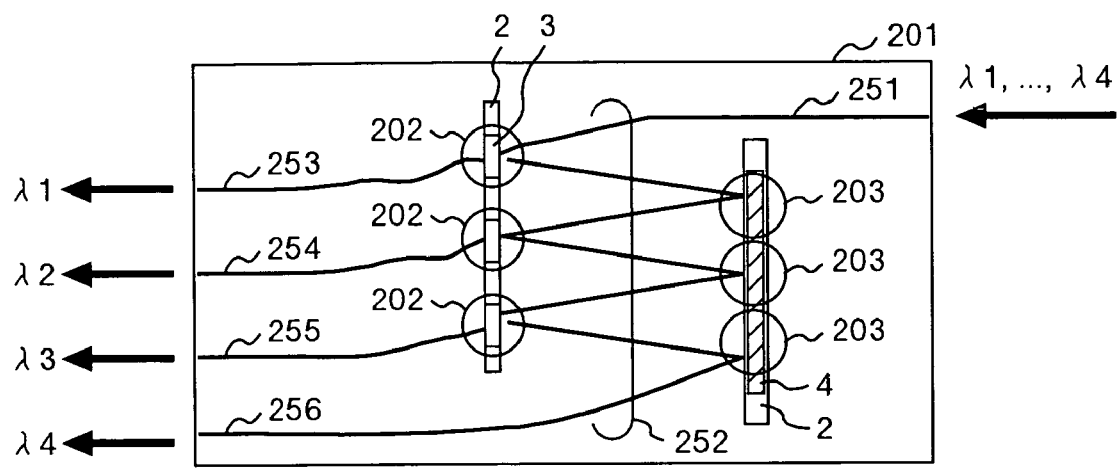
FIG. 9 is a plan view of an optical module according to a seventh embodiment of the present invention.

FIG. 9 is a plan view of an optical module using optical waveguides according to a seventh embodiment of the present invention. This is an example of a receiver for CWDM (Coarse Wavelength Division Multiplexing). In this embodiment, three reflectors 203 according to the second or fourth embodiment and three optical multiplexer/demultiplexers according to the first or the third embodiment are formed on a PLC substrate 201. The three optical multiplexer/demultiplexers are different from one another in transmission wavelength and reflection wavelength. According to this construction, transmitted signal light in which light beams of four types of wavelengths λ1 to λ4 are superimposed can be propagated dividedly as individual wavelengths and received respectively by optical waveguides 253, 254, 255 and 256 through optical waveguides 251 and 252.

Although the present invention has been described above mainly using examples applied to a planer lightwave circuit type optical demultiplexer, no limitation is made thereto, but the invention is also applicable to such optical modules using optical waveguides as a polarizer, optical switch, and optical coupler. That is, the present invention is applicable to optical waveguide portions wherein optical waveguides and a light transmitting or reflecting or absorbing functional component or functional portion are integrated and used.

As the function of the functional component or functional portion, one optimal for the purpose concerned may be selected. For example, light polarization controlling function, light phase controlling function, light deflecting function, light condensing function, and light dispersing function, are utilizable.

Figure 19:
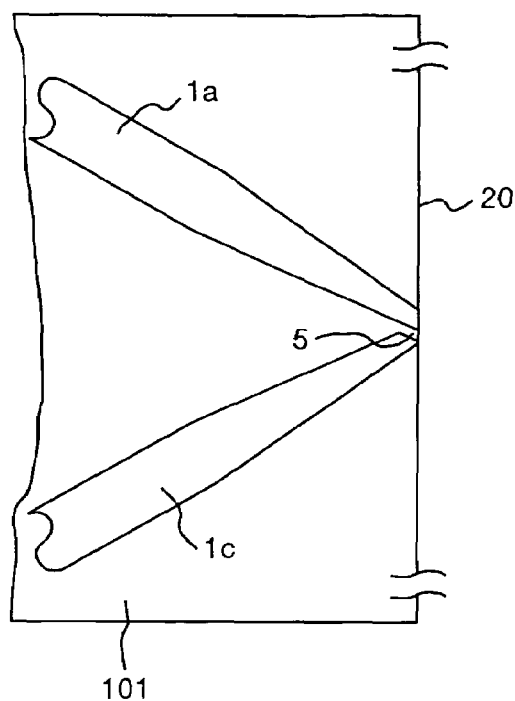
FIG. 19 is a top view showing an example of an optical waveguide substrate utilizing an optical waveguide facet.

The functional component or functional portion can be positioned and held by a groove. Further, the functional component can be made an optical waveguide substrate capable of being connected as a separate part by utilizing an optical waveguide facet as shown in FIG. 19. FIG. 19 is a top view showing optical waveguides 1a and 1b arranged on a substrate 101 of the optical module, the optical waveguide 1b being disposed so as to intersect the optical waveguide 1a. A gap 5 is present between the optical waveguides 1a and 1b. In this embodiment, moreover, an optical waveguide facet 20 is formed. Thus, in this embodiment, unlike the mode shown in FIG. 1, one facet of each optical waveguide is not in contact with the groove, but is formed directly as an optical waveguide facet. The foregoing separate members can be disposed in a bonded or closely contacted state or through a gap. Further, the functional portion can also be formed at such a facet of an optical waveguide substrate as shown in FIG. 19 by a known method such as, for example, evaporation or plating. As in a case of utilizing an optical waveguide facet, an optical waveguide substrate is included as a member which forms an optical module using optical waveguides. That is, an optical waveguide having a core shape to which the present invention is applied or an optical waveguide substrate having a groove or bonding portion formed in the optical waveguide is included. By forming an optical waveguide with use of plastic or resin or a polymer, it is also possible to obtain a flexible film-like optical waveguide.

In a case of utilizing a groove, the functional part as a separate part may be disposed in the groove. The functional part may be built in a groove or bonding portion. For example, by filling the groove or bonding portion with a material (any of solid, liquid and gas will do) having a refractive index different from that of the core of the optical waveguide, it is possible to obtain such a function as light transmitting, reflecting, or absorbing function.

Not only dicing but also such a known method as etching or cleaving may be adopted in order to form a groove or a facet.

The number of optical waveguide cores may be two as shown in FIGS. 4, 6 and 19, or may be three as shown in FIG. 5, or may be four as shown in FIG. 4 or more.

Figure 20:
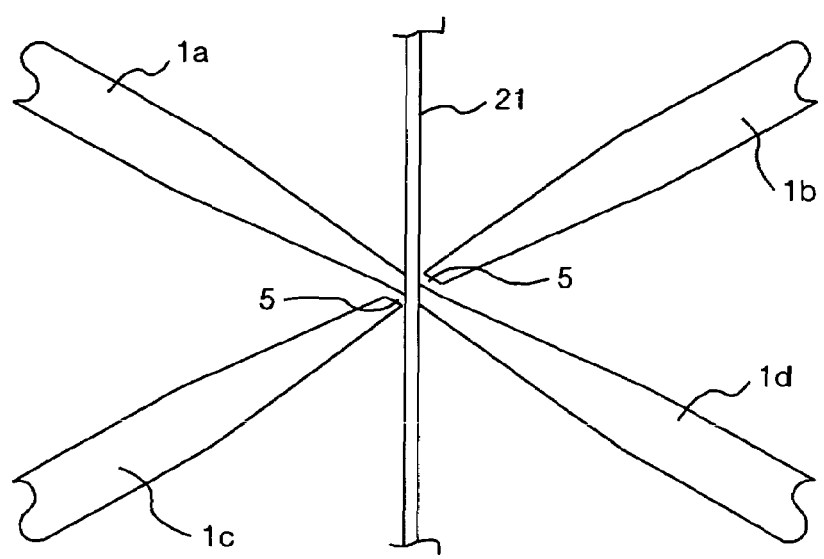
FIG. 20 is a plan view showing a still further example according to the present invention.

FIG. 20 is a top view of a still further embodiment of the present invention which is illustrated on the basis of the above description. FIG. 20 shows the relationship between cores (1a, 1b, 1c, 1d) of optical waveguides on a substrate 101 and a groove or bonding portion. In this embodiment, unlike the mode illustrated in FIG. 1, an optical waveguide 1b (only its core portion is shown) is further disposed. A gap 5 is present between the optical waveguides 1a and 1c and a gap is also present between the optical waveguides 1b and 1d. The foregoing optical waveguide facet is exposed to the bonding portion, permitting disposition of a desired separate functional part. Basic functions are the same as in the previous embodiments, but since the cores 1a and 1d are disposed symmetrical and the cores 1b and 1c are symmetrical, it is possible to fulfill the same function in two directions. In FIG. 20, the other portions are identified by the same reference numerals as in the previous description.

Figure 21:
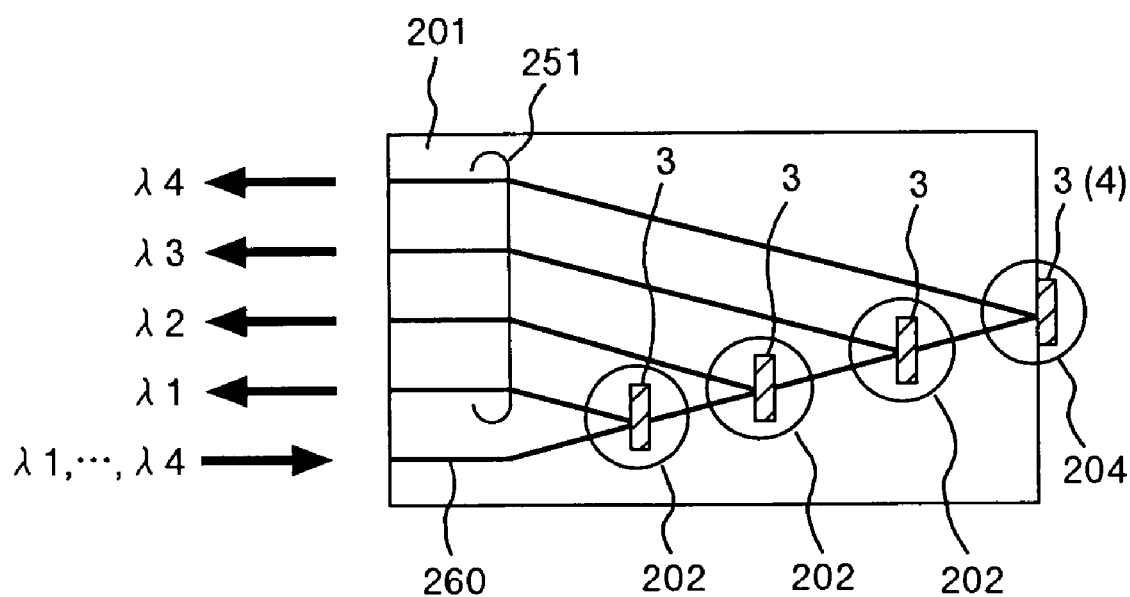
FIG. 21 is a top view showing an example of an optical multiplexer/demultiplexer having an optical waveguide substrate which utilizes an optical waveguide facet.

FIG. 21 shows an example of a receiver for CWDM which utilizes an optical waveguide facet. Three optical multiplexer/demultiplexers described in the above first or third embodiment are formed on a PLC substrate 201. In this example, moreover, a reflector 204 is provided which utilizes a facet of the PLC substrate, i.e., an optical waveguide facet. Transmitting and reflecting wavelengths are different between the optical multiplexer/demultiplexers 202 and the reflector 204. The optical multiplexer/demultiplexers 202 and the reflector 204 are optically connected as indicated by a thick line. A wavelength selection filter 3 or a mirror 4 is disposed at an optical waveguide facet of the reflector 4. Such optical members are formed in an integrated state in an optical waveguide. In this example, wavelength division multiplexed light (wavelengths $\lambda 1$, $\lambda 2$, $\lambda 3$, $\lambda 4$) is inputted from an optical waveguide 260. While passing through the optical multiplexer/demultiplexers 202 and the reflector 204, light segments of wavelengths $\lambda 1$, $\lambda 2$, $\lambda 3$ and $\lambda 4$ are demultiplexed respectively to optical waveguides and are transmitted. Unlike the example shown in FIG. 9, this example is characteristic in that the incidence of the wavelength division multiplexed light and the output of demultiplexed light segments are performed from one and same side face.

The present invention is effective irrespective of the materials of substrate, optical waveguides and other constituent elements and no limitation is made to the above embodiments.

To facilitate understanding of the drawings, a brief description will be given below of reference numerals.

1 (1a, 1b, 1c) . . . core
2 . . . dicing groove
3 . . . wavelength selection filter
4 . . . mirror
5 . . . gap between cores
101 . . . Si substrate
102 . . . $SiO_2$ film
103 . . . clad
104 . . . clad
111 . . . air bubble
112 . . . core
113 . . . clad
114 . . . zero-order mode
115 . . . light distribution after propagation
201 . . . PLC substrate
211 . . . optical waveguide
212 . . . optical waveguide
213 . . . optical waveguide
221 . . . single mode fiber
231 . . . optical waveguide
232 . . . optical waveguide
233 . . . optical waveguide
222 . . . single mode fiber
223 . . . single mode fiber
241 . . . fiber amplifier
251 . . . optical waveguide
252 . . . optical waveguide
253 . . . optical waveguide
254 . . . optical waveguide
255 . . . optical waveguide
256 . . . optical waveguide

POSTSCRIPT

The following optical module using optical waveguides is a useful form and therefore will be described in an orderly manner.

An optical module using optical waveguides, comprising at least:

an optical waveguide having a first core and an optical waveguide having a second core, an axial extension of the first core and that of the second core intersecting each other, wherein a gap is formed between the first and second cores in adjacency to the intersecting region between the axial extensions of the first and second cores, the gap being formed between a side face of the optical waveguide having the first core which side face runs along the axial direction of the first core and a light output face of the optical waveguide having the second core, the width of the first core and that of the second core are narrower in the vicinity of the intersecting region between the axial extensions of the first and second cores than the respective other core portions, and the optical waveguide having the first core and the optical waveguide having the second core are optically coupled with each other through a light output face of the optical waveguide having the first core.

INDUSTRIAL APPLICABILITY

According to the present invention a PLC type optical multiplexer/demultiplexer of reduced loss can be fabricated in a simple manner.

The invention claimed is:

1. An optical module using optical waveguides, comprising at least:
a single mode optical waveguide having a first core and a single mode optical waveguide having a second core, an axial extension of said first core and that of said second core intersecting each other;
wherein:
a gap is formed between said first and second cores in adjacency to the intersecting region between the axial extensions of said first and second cores;
said gap being formed between a side face of said optical waveguide having the first core which side face runs along the axial direction of the first core and a light output face of said optical waveguide having the second core;
the width of said first core and that of said second core are narrower in the vicinity of the intersecting region between the axial extensions of said first and second cores than the respective other core portions so that a spot diameter of propagating light becomes larger;
the optical waveguides of said optical module each have a region of a non-linear shape as viewed in plan at a position spaced away from the narrowed region of the core thereof; and
a groove which constitutes one end portion of said first core and a member having at least one of light transmitting, reflecting and absorbing characteristics and inserted into said groove are provided adjacent to the intersecting region between the axial extensions of said first and second cores.

2. An optical module having optical waveguides, comprising at least:
a single mode optical waveguides having a first core and a single mode optical waveguide having a second core, an axial extension of said first core and that of said second core intersecting each other;
wherein:
a gap is formed between said first and second cores in adjacency to the intersecting region between the axial extensions of said first and second cores;
said gap being formed between a side face of said optical waveguide having the first core which side face runs along the axial direction of the first core and a light output face of said optical waveguide having the second core;
the width of said first core and that of said second core are narrower in the vicinity of the intersecting region between the axial extensions of said first and second cores than the respective other core portions so that a spot diameter of propagating light becomes larger;
a groove which constitutes one end portion of said first core and a member having at least one of light transmitting, reflecting and absorbing characteristics and inserted into said groove are provided adjacent to the intersecting region between the axial extensions of said first and second cores;
a single mode optical waveguide having a third core on a side opposite to said first core with respect to said member having at least one of light transmitting, reflecting and absorbing characteristics, the width of said third core being narrower than the other core portion in the vicinity of said groove so that a spot diameter of propagating light becomes large; and
the optical waveguides of said optical module each have a region of a non-linear shape as viewed in plan at a position spaced away from the narrowed region of the core thereof.

3. An optical module using optical waveguides according to claim 2, wherein said first and third cores are separated from each other by the groove after formed integrally.

4. An optical module using optical waveguides according to claim 1, wherein said member having at least one of light transmitting, reflecting and absorbing characteristics is a member selected from the group consisting of a wavelength selection filter, a reflecting mirror, a half mirror, and a light absorbing plate.

5. An optical module using optical waveguides according to claim 2, wherein said member having at least one of light transmitting, reflecting and absorbing characteristics is a member selected from the group consisting of a wavelength selection filter, a reflecting mirror, a half mirror, and a light absorbing plate.

6. An optical module using optical waveguides according to claim 1, wherein the width in a direction orthogonal to the axial direction of said first core and the width in a direction orthogonal to the axial direction of said second core are narrower in tapered form in the vicinity of and toward said groove.

7. An optical module using optical waveguides according to claim 2, wherein the width in a direction orthogonal to the axial direction of said first core and the width in a direction orthogonal to the axial direction of said second core are narrower in tapered form toward said groove in the vicinity of and toward said groove.

8. An optical module using optical waveguides according to claim 1, wherein the tapered shape of the width in the direction orthogonal to the axial direction of said first core and that of the width in the direction orthogonal to the axial direction of said second core are each a shape such that an intensity distribution of light guided through the tapered region undergoes a quasi-static change in the axial direction.

9. An optical module using optical waveguides according to claim 2, wherein the tapered shape of the width in the direction orthogonal to the axial direction of said first core and that of the width in the direction orthogonal to the axial direction of said second core are each a shape such that an intensity distribution of light guided through the tapered region undergoes a quasi-static change in the axial direction.

10. An optical module using optical waveguides, comprising:
a substrate, a first clad layer formed over said substrate, at least first and second cores formed over said first clad layer, and a second clad layer covering at least said first and second cores;
wherein:
an optical waveguide having said first core and an optical waveguide having said second core are each a single mode optical waveguide;
said second core has a certain angle relative to said first core and is optically coupled to said first core through a gap;
said gap being formed between a side face of said optical waveguide having the first core which side face runs along the axial direction of the first core and a light output face of said optical waveguide having the second core;
the width of said first core and that of said second core in the vicinity of the optically coupled region are narrower than the respective other core portions so that a spot diameter of propagating light becomes larger;
a groove is formed so as to intersect said first core in the portion where the width of the first core is narrower than the other core portion and in adjacency to the region where said second core is optically coupled to said first core; and
the optical waveguides of said optical module each have a region of a non-linear shape as viewed in plan at a position spaced away from the narrowed region of the core.

11. An optical module using optical waveguides according to claim 10, wherein a member having at least one of light transmitting, reflecting and absorbing characteristics is inserted into said groove.

12. An optical module using optical waveguides according to claim 11, wherein said member having at least one of light transmitting, reflecting and absorbing characteristics is a member selected from the group consisting of a wavelength selection filter, a reflecting mirror, a half mirror, and a light absorbing plate.

13. An optical module using optical waveguides according to claim 10, wherein the width in a direction orthogonal to the axial direction of said first core and the width in a direction orthogonal to the axial direction of said second core are narrower in tapered form in the vicinity of and toward said groove.

14. An optical module using optical waveguides according to claim 10, wherein the tapered shape of the width in a direction orthogonal to the axial direction of said first core and that of the width in a direction orthogonal to the axial direction of said second core are each a shape such that an intensity distribution of light guided through the tapered region undergoes a quasi-static change in the axial direction.

15. An optical module using optical waveguides according to claim 10, wherein between said groove and a terminal point of termination of changes in the width in a direction orthogonal to the axial direction of said first core and in the width in a direction orthogonal to the axial direction of said second core, the width in a direction orthogonal to the axial direction of said first core and the width in a direction orthogonal to the axial direction of said second core correspond each to the width at said terminal point of termination of a change in width of each of the cores.

16. An optical module using optical waveguides, comprising at least:
a single mode optical waveguide having a first core and a single mode optical waveguide having a second core, an axial extension of said first core and that of said second core intersecting each other;
wherein:
a gap is formed between said first and second cores in adjacency to the intersecting region between the axial extensions of the first and second cores;
said gap being formed between a side face of said optical waveguide having the first core which side face runs along the axial direction of the first core and a light output face of said optical waveguide having the second core;
the width of said first core and that of said second core are narrower in the vicinity of the intersecting region between the axial extensions of said first and second cores than the respective other core portions so that a spot diameter of propagating light becomes larger;
a plurality of optical waveguide constructions are provided in adjacency to the intersection region between the axial extensions of said first and second cores, each of said optical waveguide constructions comprising a groove which constitutes one end portion of said first core and a member having at least one of light transmitting, reflecting and absorbing characteristics and inserted into said groove; and
the optical waveguides of said optical module each have a region of a non-linear shape as viewed in plan at a position spaced away from the narrowed region of the core.

17. An optical module using optical waveguides according to claim 16, wherein said member having at least one of light transmitting, reflecting and absorbing functions is provided on a light output face of said optical waveguide having the first core.

* * * * *